United States Patent [19]
Johnson et al.

[11] Patent Number: 5,263,105
[45] Date of Patent: Nov. 16, 1993

[54] CONNECTOR ASSEMBLY FOR CONNECTING AN OPTICAL FIBER CABLE TO A SOCKET

[75] Inventors: Melvin H. Johnson, Chadds Ford, Pa.; Frank M. Willis, Wenonah

[73] Assignee: E.I. Du Pont de Nemours and Company, Wilmington, Del.

[21] Appl. No.: 890,142

[22] Filed: May 29, 1992

[51] Int. Cl.$^5$ .............................................. G02B 6/38
[52] U.S. Cl. ...................................... 385/72; 384/75; 384/85
[58] Field of Search .................. 385/55, 60, 70, 72, 385/75, 78, 85

[56] References Cited

U.S. PATENT DOCUMENTS

| | | | |
|---|---|---|---|
| 4,422,715 | 12/1983 | Williams et al. | 385/85 |
| 4,466,696 | 8/1984 | Carney | 385/49 |
| 4,707,072 | 11/1987 | Kraakman | 385/72 |
| 4,717,233 | 1/1988 | Szkaradnik | 385/70 |
| 4,722,584 | 2/1988 | Kakii et al. | 385/80 |
| 4,815,809 | 3/1989 | Szostak | 385/85 |
| 4,834,487 | 5/1989 | Abendschein et al. | 385/78 |
| 4,925,266 | 5/1990 | Huebscher et al. | 385/78 |
| 4,934,785 | 6/1990 | Mathis et al. | 385/68 |
| 5,011,256 | 4/1991 | Johnson et al. | 385/92 |
| 5,018,818 | 5/1991 | Barlow et al. | 385/55 |
| 5,101,463 | 3/1992 | Cubukciyan et al. | 385/72 |
| 5,121,456 | 6/1992 | Essert et al. | 385/70 |
| 5,170,452 | 12/1992 | Ott | 385/60 |

OTHER PUBLICATIONS

NEC Connector Advertisement, Computers and Communications, "Low-reflection connectors: the quick fix for high-speed LANS and FTTH trials", Jul. 19, 1991.

Primary Examiner—Frank Gonzalez

[57] ABSTRACT

A connector assembly for connecting an optical fiber cable to a socket may be used in field with the advantages of precision connection and testing found in a manufacturing facility. The optical fiber cable has a first end, and a first predetermined length of a first bare optical fiber extends from the first end. The connector assembly comprises a ferrule for holding a second optical fiber. The ferrule has a first end, a second end, a central axis extending between the first and the second end and a hole extending along the central axis. A first portion of the second optical fiber is disposed in the hole and a second portion of the second optical fiber extends from the first end of the ferrule. The connector assembly also comprises a device for splicing the second portion of the second optical fiber to the first predetermined length of the first bare optical fiber. A housing encloses the splicing device, the second portion of the second optical fiber and the first predetermined length of the first bare optical fiber. The housing provides strain relief for the first predetermined length of the first bare optical fiber and for the second portion of the second optical fiber.

10 Claims, 11 Drawing Sheets

CONNECTOR ASSEMBLY FOR CONNECTING AN OPTICAL FIBER CABLE TO A SOCKET

BACKGROUND OF THE INVENTION

1. Field of the Invention

The present invention relates to a connector assembly for connecting an optical fiber cable to a socket.

2. Description of the Related Art

It is known in the field of optical communications to terminate an optical fiber transmission cable by ending the optical fiber in a connector, with the optical fiber secured in a ferrule. Such a connector is used to connect the optical fiber cable, through a socket, to other devices, such as sources, detectors or repeaters, or to passive devices like switches or attenuators.

Typically, a connector is assembled by first taking one end of the optical fiber cable and stripping off the protective covering, exposing the bare optical fiber, which is usually about 125 $\mu$m in diameter. Next, the fiber is inserted into a hole in the center of a ferrule, which may be a plug-type, a biconic type, or other type, so that the end of the optical fiber extends a short distance from the end of the ferrule. The optical fiber is then secured to the ferrule by epoxy, glue, adhesive or any other means, and the end is polished flush with the end of the ferrule.

A housing is placed around the ferrule and the optical fiber to hold the ferrule and to provide strain relief for the optical fiber. The actual design of the housing depends on the intended use for the connector. The optical fiber is very fragile and can be broken quite easily. The housing typically clamps to a protective cable around the optical fiber and holds the ferrule so no stress is applied directly to the optical fiber itself.

A typical example of an optical fiber connector assembly employing an ST ® connector and which includes a glass ferrule is disclosed in U.S. Pat. No. 4,934,785 to Mathis et al. Another example of an optical fiber connector is disclosed in U.S. Pat. No. 4,834,487 to Abendschein et al., which describes an optical connector assembly which includes a plastic alignment ferrule. In these patents, the end of the optical fiber cable is inserted in the ferrule and the end of the ferrule is polished in the field where the connector assembly is needed.

A problem associated with such known connectors arises in centering the fiber in the ferrule and in centering the ferrule in the receptacle. If the optical fiber is not exactly centered in the ferrule, and if the ferrule cannot be exactly centered in the receptacle, a loss of light energy will occur due to misalignment. Hence, tight tolerances are needed to maintain the diameter of the hole in the ferrule, the location of the hole and the centering of the optical fiber in the hole while it is secured in the ferrule.

In order to maintain proper positioning of a fiber optic cable during assembly of a fiber optic connector, it is not always possible to maintain these tight tolerances without extensive equipment and time. This limitation becomes more important for single mode fibers whose core diameters are on the order of 9 $\mu$m, where even tighter tolerances must be maintained. For example, the optical fibers must be located to within $\pm 0.75$ $\mu$m of the optical axis, which is determined by the socket, to insure losses less than 0.1 db for a connector for the single mode fibers. The optical fiber diameter tolerances are typically $\pm 1$ $\mu$m, and the concentricity of the core is typically $\pm 0.5$ $\mu$m. Hence, the eccentricity of the core of a fiber in a ferrule which is just large enough to accept the largest fiber could be as much as 1.5 $\mu$m. Any additional error in the ferrule hole concentricity or diameter could increase the eccentricity of the fiber mounted in the ferrule. The quality of the polishing of the end of the fiber can also markedly effect fiber coupling losses.

While techniques have been developed to improve this task in the laboratory or in a manufacturing facility, installment in the field of a connector many times results in connectors with high light energy losses. These energy losses thus result in the need to re-make the connector, which in turn results in wasted connectors and lost time. Thus, a need exists for a reliable connector assembly which can be assembled in the field with minimum energy loss.

SUMMARY OF THE INVENTION

Accordingly, it is an object of the present invention to design a connector assembly where a portion of the optical fiber cable is inserted in the ferrule in the factory so that it is possible to certify that the portion of the fiber extending through the ferrule is exactly centered. This ensures that the loss associated therewith is below a certain limit, thereby improving the precision of a connector assembly.

It is also an object of the present invention to design a connector assembly where a portion of the optical fiber cable is inserted in the ferrule in the factory so that the cleanliness of a connector assembly and thus the precision of such an assembly is improved.

A further object of the present invention is to design a connector assembly where a portion of the optical fiber cable is inserted in the ferrule in the factory so that the cost of making a connector assembly is markedly reduced.

It is also an object of the present invention to design a connector assembly which is capable of terminating a high-precision ferrule on a less precise optical cable, which provides versatility for the assembly.

In order to achieve the foregoing objects, there is provided a connector assembly for connecting an optical fiber cable to a socket. The optical fiber cable has a first end and a first predetermined length of a first bare optical fiber extending from the first end. The connector assembly comprises a ferrule for holding a second optical fiber. The ferrule has a first end, a second end, a central axis extending between the first and the second end and a hole extending along the central axis. A first portion of the second optical fiber is disposed in the hole, and a second portion of the second optical fiber extends from the first end of the ferrule. The connector assembly also comprises a device for splicing the second portion of the second optical fiber to the first predetermined length of the first bare optical fiber. A housing encloses the splicing device, the second portion of the second optical fiber and the first predetermined length of the first bare optical fiber. The housing provides strain relief for the first predetermined length of the first bare optical fiber and for the second portion of the second optical fiber.

BRIEF DESCRIPTION OF THE DRAWINGS

The accompanying drawings, which are incorporated in and constitute a part of the specification, illustrate the presently preferred embodiment of the invention, and together with the general description given above and the detailed description of the preferred embodiment given below, serve to explain the principles of the invention.

DESCRIPTION OF THE PREFERRED EMBODIMENT

Figure 1:
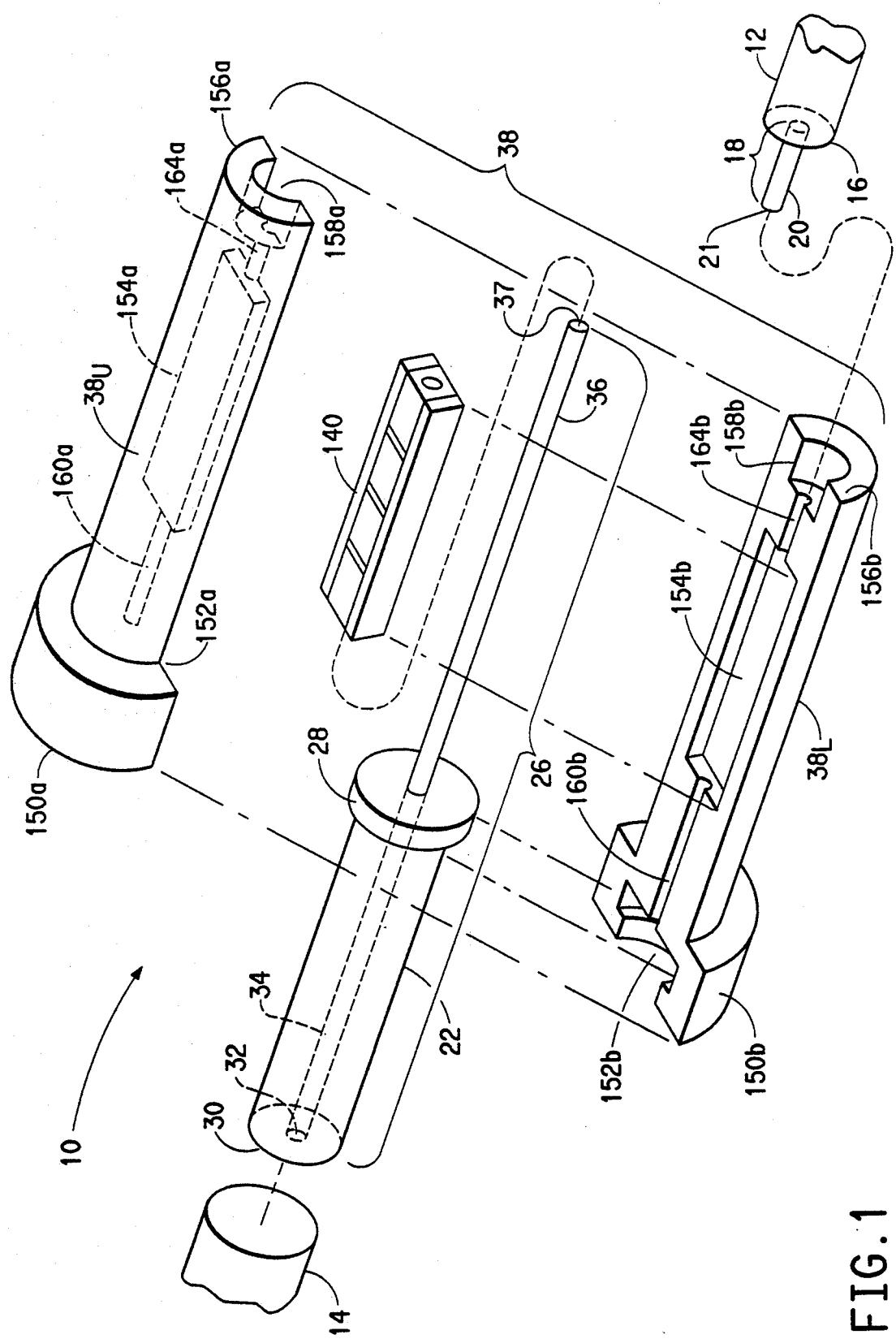
FIG. 1 is an exploded, schematic view of the connector assembly of the present invention.

Reference will now be made in detail to the present preferred embodiment of the invention as illustrated in the accompanying drawings.

In accordance with the present invention, there is provided a connector assembly for connecting an optical fiber cable to a socket. A connector assembly in accordance with the present invention is shown generally at 10, an optical fiber cable is shown at 12 and a socket is shown at 14 in FIG. 1. Optical fiber cable 12 has a first end 16 and a first predetermined length 18 of a first bare optical fiber 20 extending from the first end. First bare optical fiber 20 is cleaved at an end 21 thereof to the first predetermined length.

The connector assembly of the present invention comprises a ferrule 22 for holding a second optical fiber 26. Ferrule 22 has a first end 28, a second end 30 and a central axis extending between the first and the second end. A hole 32 is formed in ferrule 22 and extends along the central axis. A first portion 34 of second optical fiber 26 is disposed in hole 32. First portion 34 is secured in hole 32 by epoxy, glue, adhesive or other means as known in the art. A second portion 36 of second optical fiber 26 extends from the first end 28 of the ferrule. Second portion 36 of second optical fiber 26 is cleaved at an end 37 thereof to a second predetermined length. Second optical fiber 26 has a thin titanium molecular coating which protects second portion 36 from the effects of the atmosphere. In addition, this coating makes the fiber better for the molding operation of the ferrule, described below, and also makes the fiber much tougher.

Ferrule 22 may be made of a molded plastic material which is selected to provide minimal shrinkage. Molded plastic is a preferred choice of material because it is relatively inexpensive. Preferably, the molded plastic is a liquid crystal polymer, which provides optimal minimal shrinkage. An example of a liquid crystal polymer suitable for making the ferrule of the present invention is B230 VECTRA®, commercially available from Hoechst Celanese of Chatham, N.J. In other embodiments, the ferrule may be made of a plurality of materials. The materials may comprise plastic, such as a liquid crystal polymer as noted above, and glass or mica. Alternatively, the ferrule may be made of a ceramic material, such as alumina, glass or metal.

As known in the art, ferrule 22 and the end of second optical fiber 26 which is disposed at second end 30 of the ferrule are polished. After the second optical fiber is secured in hole 32, the length which protrudes from second end 30 is removed, e.g., by scribing and breaking, and the end of the fiber is polished flush with the second end, for instance, by polishing on 8 μm, followed by 1 μm, polishing paper.

Figure 2:
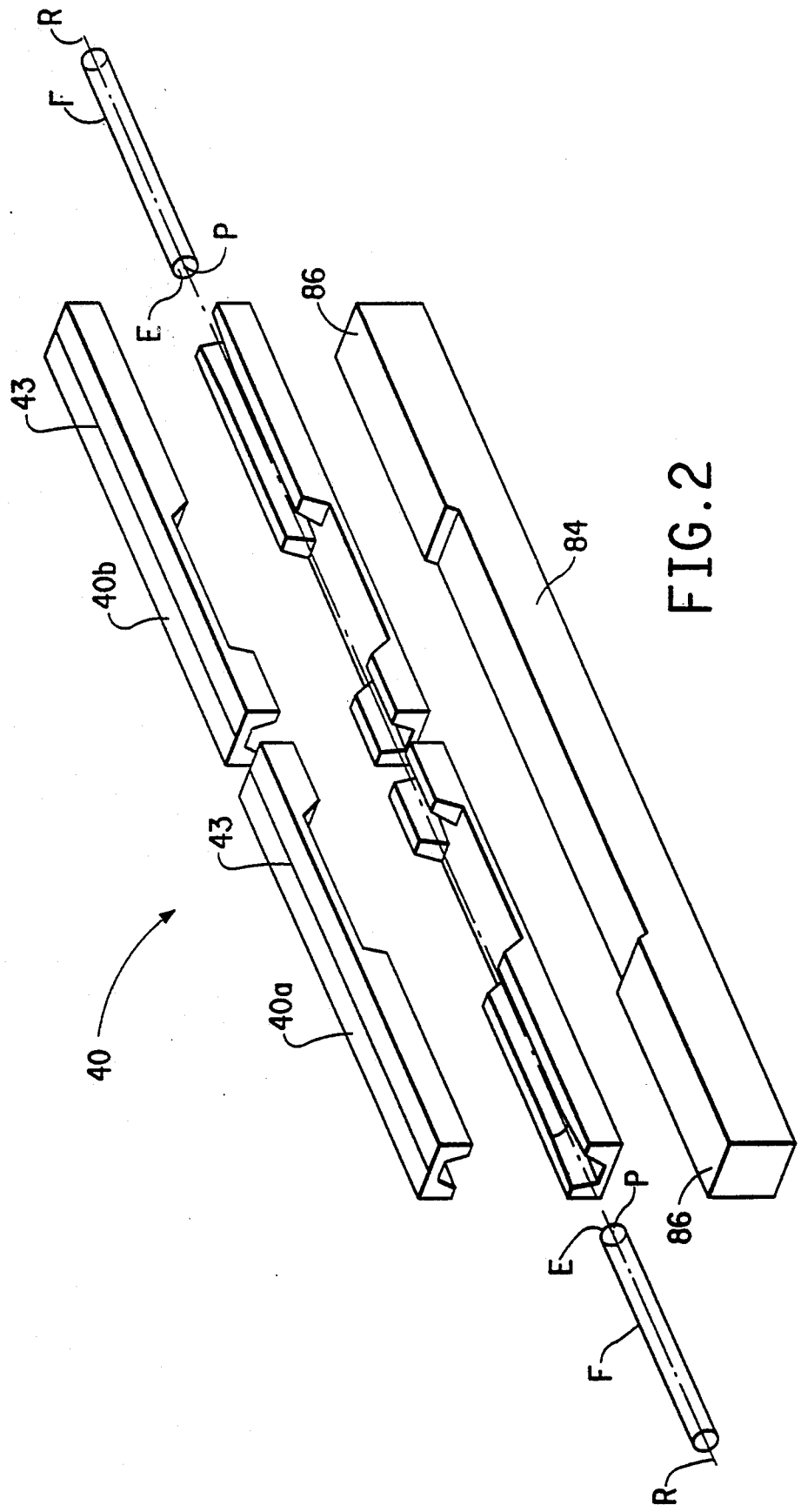
FIG. 2 is an exploded isometric view of a pair of centering devices which forms the splicing device used in accordance with the present invention.
Figure 3:
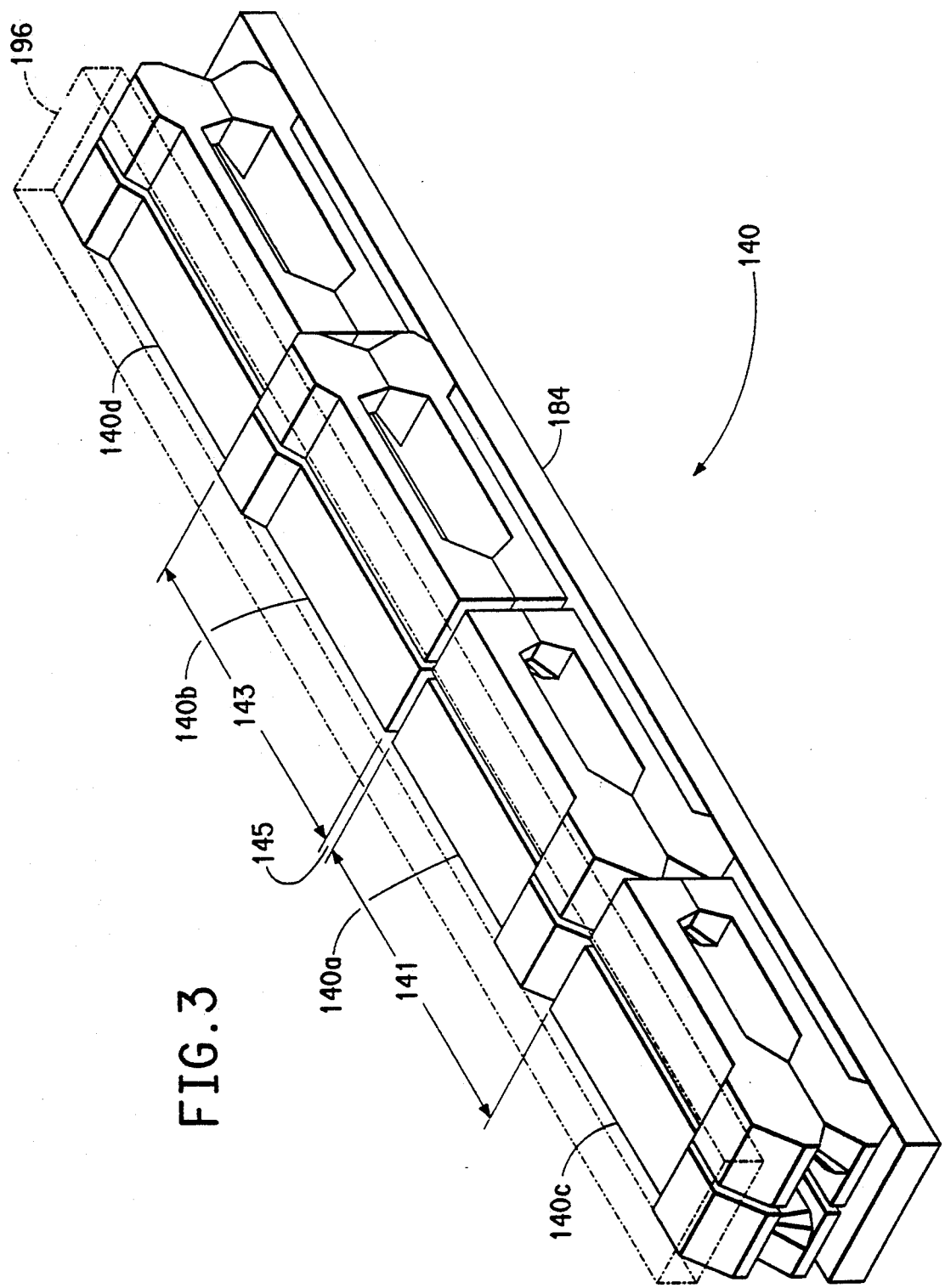
FIG. 3 is a partial perspective view of a preferred splicing device used with the present invention that includes the centering device as shown in FIG. 2 and a clamp rearwardly disposed therefrom.

The connector assembly of the present invention also comprises a splicing device. A splicing device used in accordance with the present invention is shown generally at 40 in FIG. 2. Splicing device 40 splices second portion 36 of second optical fiber 26 to first predetermined length 18 of first bare optical fiber 20. Splicing device 40 as shown in FIG. 2 comprises a plurality of centering devices 40a and 40b disposed back-to-back and have a predetermined distance, or gap, therebetween. The most preferred arrangement of the splicing device used with the present invention is an enhanced splicing device 140 as shown in FIGS. 1 and 3. The arrangement shown in FIGS. 1 and 3 enhances the ability of the splicing device to precisely position a fiber into alignment with a reference axis. As shown in FIG. 3, enhanced splicing device 140 comprises a first forward centering device 140a and a clamp 140c, which may be a centering device, similar in all respects to centering device 140a, disposed a first predetermined distance 141 behind first forward centering device 140a and axially aligned therewith. Enhanced splicing device also comprise a second forward centering device 140b and a clamp 140d, which may be a centering device, similar in all respects to centering device 140a or 140b, disposed a second predetermined distance 143 behind centering device 140b and axially aligned therewith. As shown in FIG. 3, first forward centering device 140a faces second forward centering device 140b with a gap 145 disposed therebetween. Although clamps 140c and 140d are shown and described as comprising centering devices, the clamping function may alternatively be performed by any arrangement of suitable form. Also, although two centering devices and two clamps are shown, the enhanced splicing device of the present invention may comprise any number of centering devices and clamps, as long as they are all axially aligned. As shown in FIG. 3, enhanced splicing device 140 also comprises a mounting foundation 184 on which centering devices 140a–d rest, and a cap 196 disposed on top of the centering devices.

Figure 4:
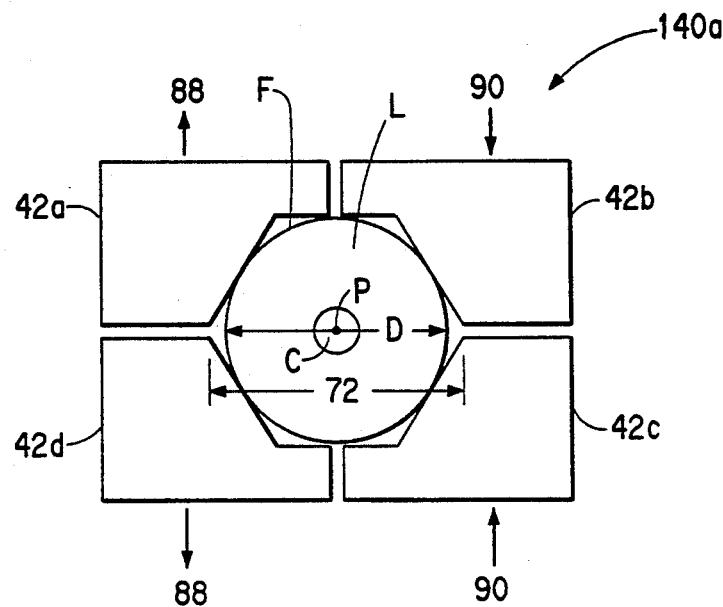
FIG. 4 is a partial front elevational view of an assembled centering device with the fingers thereof holding a fiber in the centering position.
Figure 5:
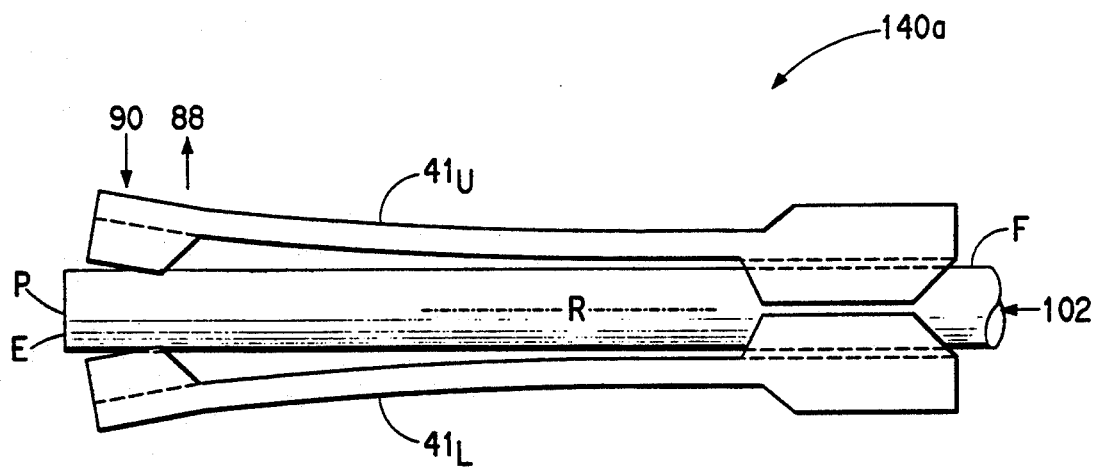
FIG. 5 is a partial side elevational view of an assembled centering device used with the present invention with the fingers thereof holding a fiber in the centering position.

Since each centering device 40a and 40b or 140a, 140b, 140c and 140d in each pair is identical to the other, only one is turned around to face the other, a detailed description of one preferred device, 140a, follows. As shown in FIGS. 2, 4 and 5, the splicing device used with the present invention is particularly adapted to place a center point P, which is the geometric center of the fiber, on and end face E of an optical fiber F along a predetermined reference axis R. In the preferred embodiment of FIG. 3, clamps 140c and 140d serve to accurately position a point spaced a predetermined distance from the end face of fiber F into alignment with reference axis R, so that any angular misalignment between the axis of fiber F and reference axis R is minimized. Point P is disposed in a core C of fiber F as shown in FIG. 4. Core C is itself surrounded by an outer cladding layer L. Fiber F has an outer diameter D, also shown in FIG. 4. The dimension of the outer diameter D of the optical fiber may vary from fiber to fiber. Typically this diametrical variation from fiber to fiber is on the order of three (3) μm.

Figure 6:
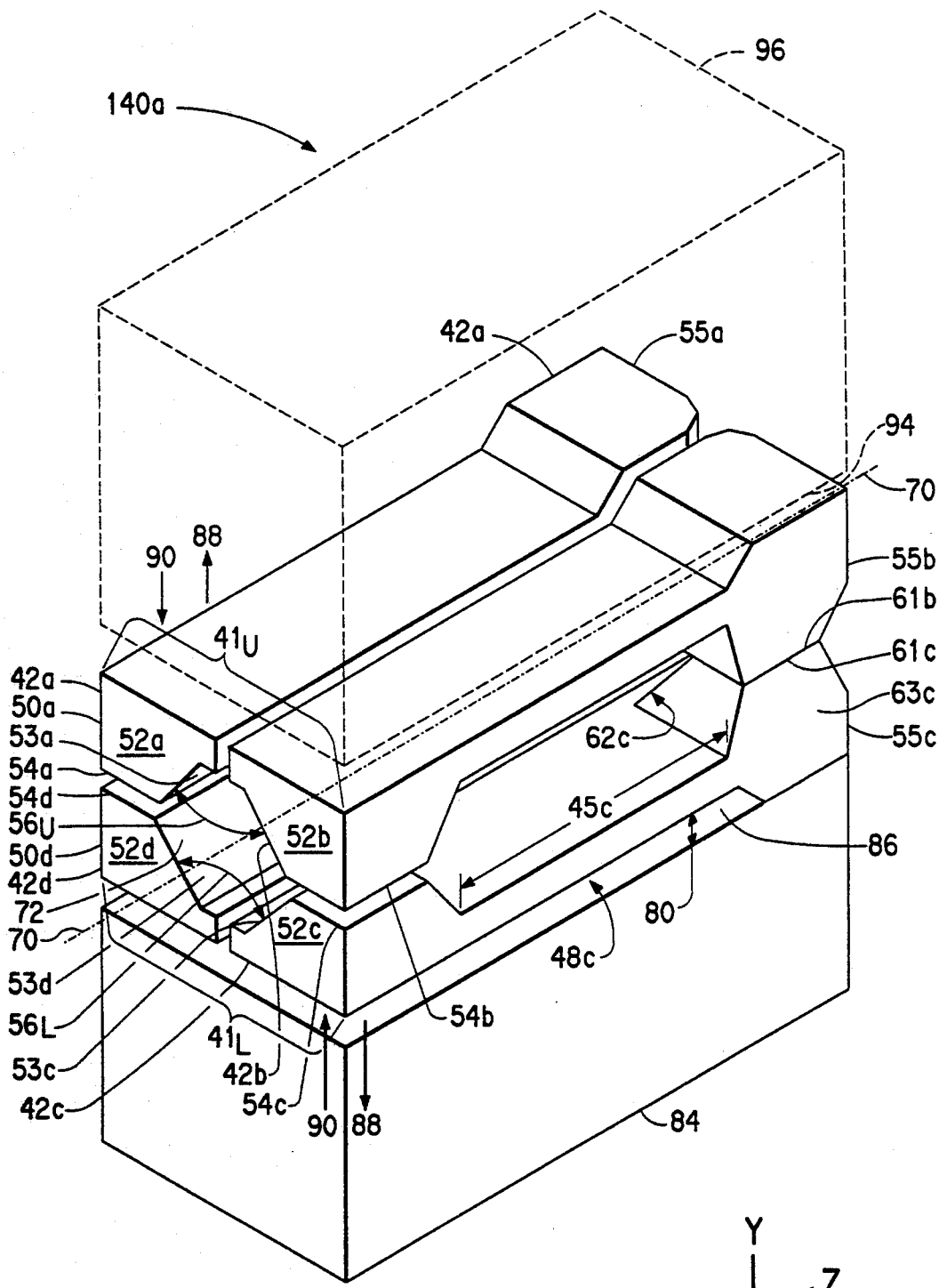
FIG. 6 is a perspective view of a centering device having a set of four articulably movable arms for positioning the center point on the end face of an optical fiber with respect to a predetermined reference axis, the mounting cap being shown in outline.

As shown in FIGS. 5 and 6, centering device 140a includes a pair of upper arms $41_U$ and a pair of lower arms $41_L$. Upper and lower arms $41_U$ and $41_L$, respectively, may be sawed along a cut line 43 as shown in FIG. 2 thereby defining upper and lower pairs of arms segments, or "fingers", 42a, 42b and 42c, 42d, respectively as shown in FIGS. 4, 11, 12 and 14. As used in this application, the term "fingers" is to be understood to be the structures defined when an "arm", as that term has been used herein, is subdivided into two axially elongated segments. Fingers 42a–d are configured in a generally planar bar form. However, the fingers need not be substantially identical, in which case adjustments may be made to provide the requisite biasing forces to maintain point P on reference axis R. However configured, the fingers of the centering device of the present invention are angularly juxtaposed to define their cooperative association. The resiliency of fingers 42a–d provides the biasing which urges them toward the closed position, as shown in FIGS. 5 and 6. However, it should be understood that the biasing could be accomplished by other means, so long as the force on each arm passes through reference axis R, and the sum of forces on the arms when they are in the centering position is substantially equal to zero. Whatever form of biasing is selected, the biasing force must increase with deflection of the arm.

Figure 7:
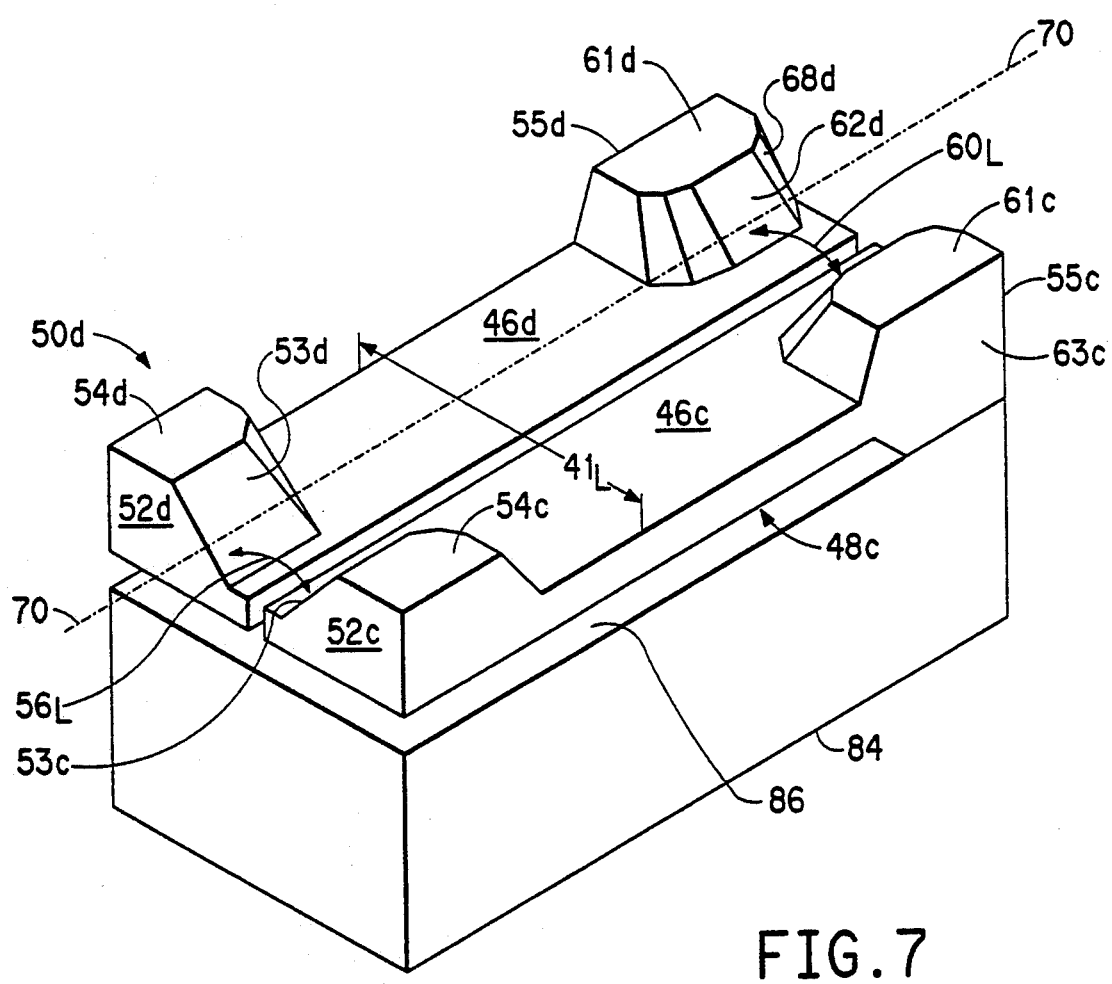
FIG. 7 is an isolated perspective view of two of the fingers of the centering device of FIG. 6.
Figure 8:
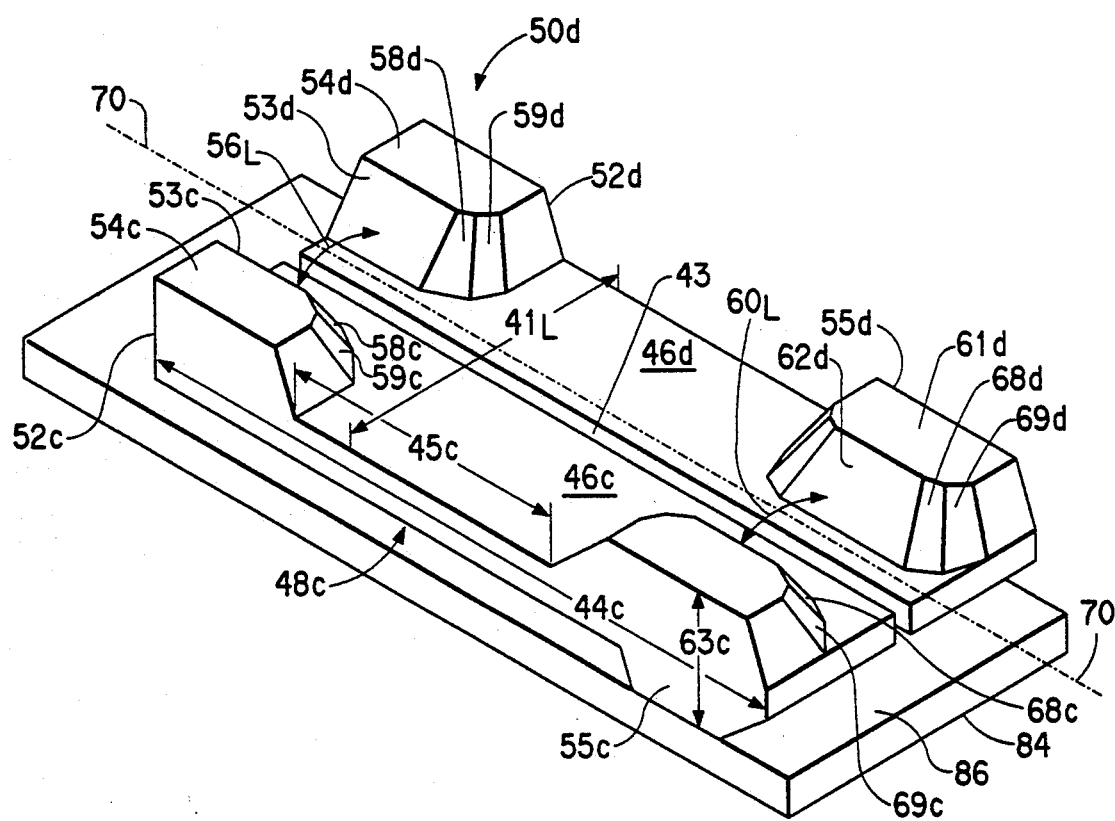
FIG. 8 is a another isolated perspective view of two of the fingers of the centering device of FIG. 6.

As shown in particular in FIG. 8, each finger includes a base portion, (although only base portion 44c is shown for finger 42c), which extends along the full length of each finger and has a central region (only central region 45c being shown in FIGS. 6 and 8). The dimension of the central region of the base portion defines the basic dimension of each finger. To provide some feeling for the physical dimensions involved, each finger 42a–d has an overall length on the order of twenty four hundred (2400) μm and a width on the order of three hundred sixty-seven (367) μm, while the entire centering device has a width of about eight hundred (800) μm. In the central region, each finger 42a–d has a thickness dimension on the order of one hundred (100) μm. The base portion also has a first major surface (only 46c and 46d being shown in FIGS. 7 and 8, with all of 46a–d being shown in FIG. 12) and a second, opposed, major surface (only 48c being shown in FIGS. 7 and 8). Each first major surface includes a relatively thicker abutment 52a–d, respectively, as shown in FIG. 6. A clip (such as 50a shown in FIG. 6 and 50d shown in FIG. 7) is defined at a first end of each finger 42a–d on abutment 52. Each abutment 52a–d has a planar surface 54a–d, respectively, thereon that preferably lies parallel to the respective first major surface of each finger. Each abutment includes a lead-in surface, such as 58c and 58d shown in FIG. 8 and 58a–d as shown in FIG. 13, and a side surface, such as 59c and 59d as shown in FIG. 8. Each abutment 52a–d also includes a planar sidewall 53a–d as shown in FIG. 8, only 53c and 53d being shown in FIGS. 7 and 8, that extends in an inclined manner (at an angle of 54.74°) from the perpendicular to the major surface of each finger 42a–d. As shown in FIG. 6 sidewalls 53a and 53b in fingers 42a and 42b of one pair of mating fingers cooperate to define an upper uniform width groove $56_U$, while sidewalls 53c and 53d in fingers 42c and 42d in the other, mating finger pair also cooperate to define a similar, lower uniform width groove $56_L$. The arms act against fiber F inserted into an upper groove $56_U$ extending between upper abutments 52a and 52b as shown in FIG. 6 and a lower groove $56_L$ extending between abutments 52c and 52d as illustrated in FIGS. 6–8 to maintain center point P on the fiber end on reference axis R.

Each finger has, at the end opposite abutments 52a–d, respectively, an enlargement abutment 55a–d as shown in FIGS. 6–8. Each enlargement abutment has an outer abutment portion (only 63c being shown in FIGS. 6–8) a plurality of side surfaces (only 69c and 69d being shown in FIG. 8,) and a top surface 61a–d, respectively, formed thereon. Surfaces 61b and 61c are shown bonded together in FIGS. 6, 9 and 11, and surfaces 61a and 61d as well as surfaces 61b and 61c, respectively, are shown bonded together in FIG. 11. Each enlargement abutment 55a–d also includes a plurality of lateral surfaces; for example, abutment 55d includes a wall 62d, a side surface 69d and converging lead-in corner 68d as shown in FIG. 8. The wall of each enlargement abutment and a portion of the major surface of each base portion, such as base portion 44c for finger 42c as shown in FIG. 8, near one end thereof form a non-converging, uniform width, truncated, V-shaped upper trough $60_U$ extending between upper fingers 42a and 42b and a lower trough $60_L$ as shown in FIG. 8. Troughs $60_U$ and $60_L$ each have an axis 70 extending centrally and axially therethrough. Troughs $60_U$ and $60_L$ are wider than the width dimension of grooves $56_U$, $56_L$, respectively. In a more preferred arrangement, lower trough $60_L$ communicates with the converging lead-in corner of the enlargement abutment defined by the cooperative association of the side surfaces provided on each enlargement abutment of each of lower fingers 42c, 42d. Such as converging lead-in corner 68d of enlargement abutment 55d as shown in FIG. 8. Although not shown, trough $60_U$ similarly communicates with a converging lead-in corner of each enlargement abutment defined by the cooperative association of the side surfaces provided on each enlargement abutment on each of the upper fingers. A most preferred arrangement has two angled surfaces at each lead-in corner of each enlargement abutment 55a–d, as shown in FIG. 8. Troughs $60_U$ and $60_L$ are uniform in depth along their axial length, as measured with respect to a dimension line drawn perpendicular to surfaces 61a-d formed on abutment portion 55a-d which extends toward the major surface of each finger, respectively.

As seen in FIGS. 6-8, centering device 40a further includes a mounting foundation 84 having a planar attachment surface 86 thereon. Enlargement abutments 55c and 55d on each finger 42c and 42d, respectively, are secured, as by fusing or soldering, to planar attachment surface 86 on slab 84. Owing to the presence of enlargement abutment 55c, second surface 48c on finger 42c of the lower pair is spaced a distance 80 from planar surface 86 as shown in FIG. 6, which is necessary to permit the movement of the lower fingers in each pair from attachment surface 86. The same holds true for the other finger 42d, although distance 80 is not shown for this finger. Enlargement abutments 55c and 55d thereby each function as a standoff to space each finger 42c, 42d away from mounting foundation 84 on which it is mounted. It should be understood that enlargement abutments 55c and 55d may be omitted, and lower fingers 42c, 42d may be mounted to a foundation (not shown) having a step thereon, in order to provide the proper clearance distance necessary to permit the movement of the lower fingers in each pair. Fingers 42a, 42b in the upper pair of fingers may also be secured, as by fusing or soldering surface, to a plurality of planar attachment surfaces 94 shown in FIG. 6 formed on a cap 96 which is disposed above fingers 42a-d. Cap 96 is shown in outline in FIG. 6 to permit illustration of fingers 42a and 42b. Enlargement abutments 55a and 55b thereby function as a standoff to space each finger 42a and 42b away from cap 96.

Figure 9:
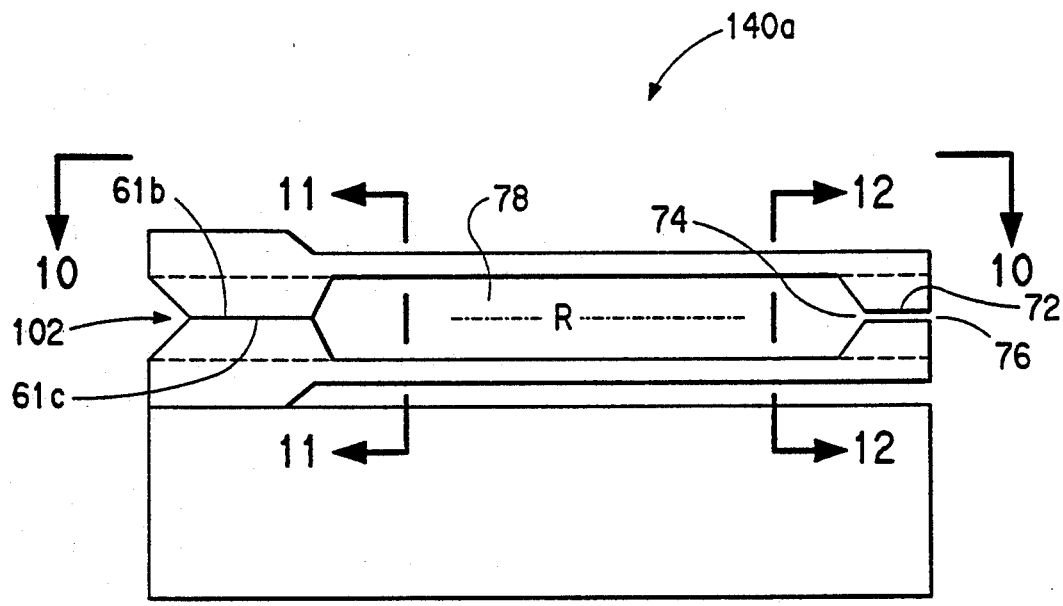
FIG. 9 is a side elevational view of the assembled centering device of FIG. 6.
Figure 10:
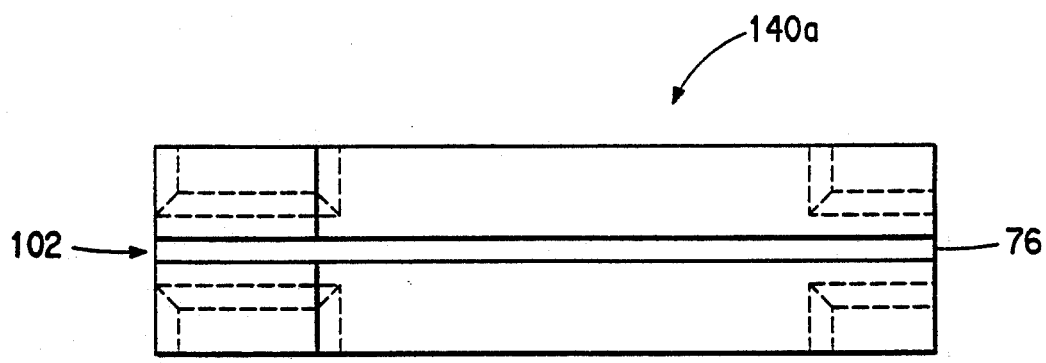
FIG. 10 is a top view of the centering device of FIG. 9, taken along lines 10—10 therein.
Figure 11:
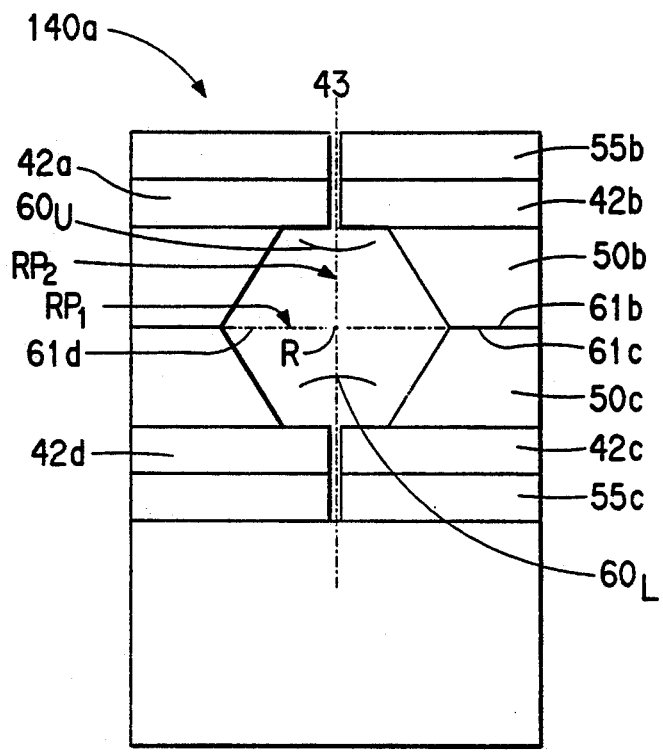
FIG. 11 is a sectional view of the assembled centering device of FIG. 9, taken along section lines 11—11 of FIG. 9.
Figure 12:
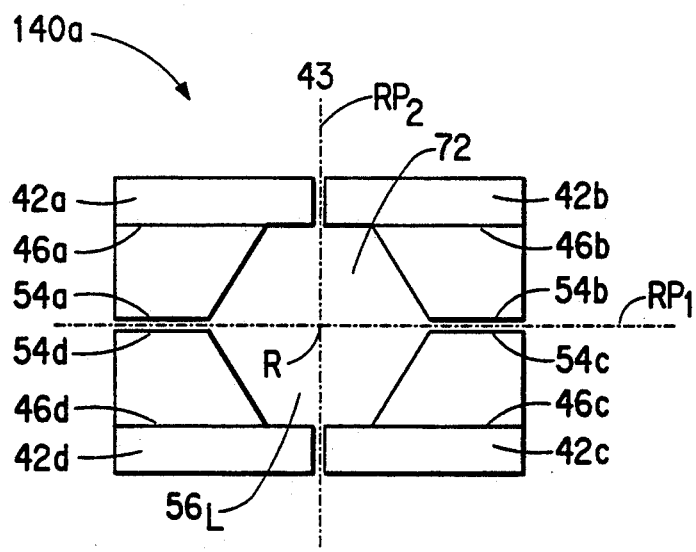
FIG. 12 is another sectional view of the assembled centering device of FIG. 9, taken along section lines 12—12 of FIG. 9.
Figure 13:
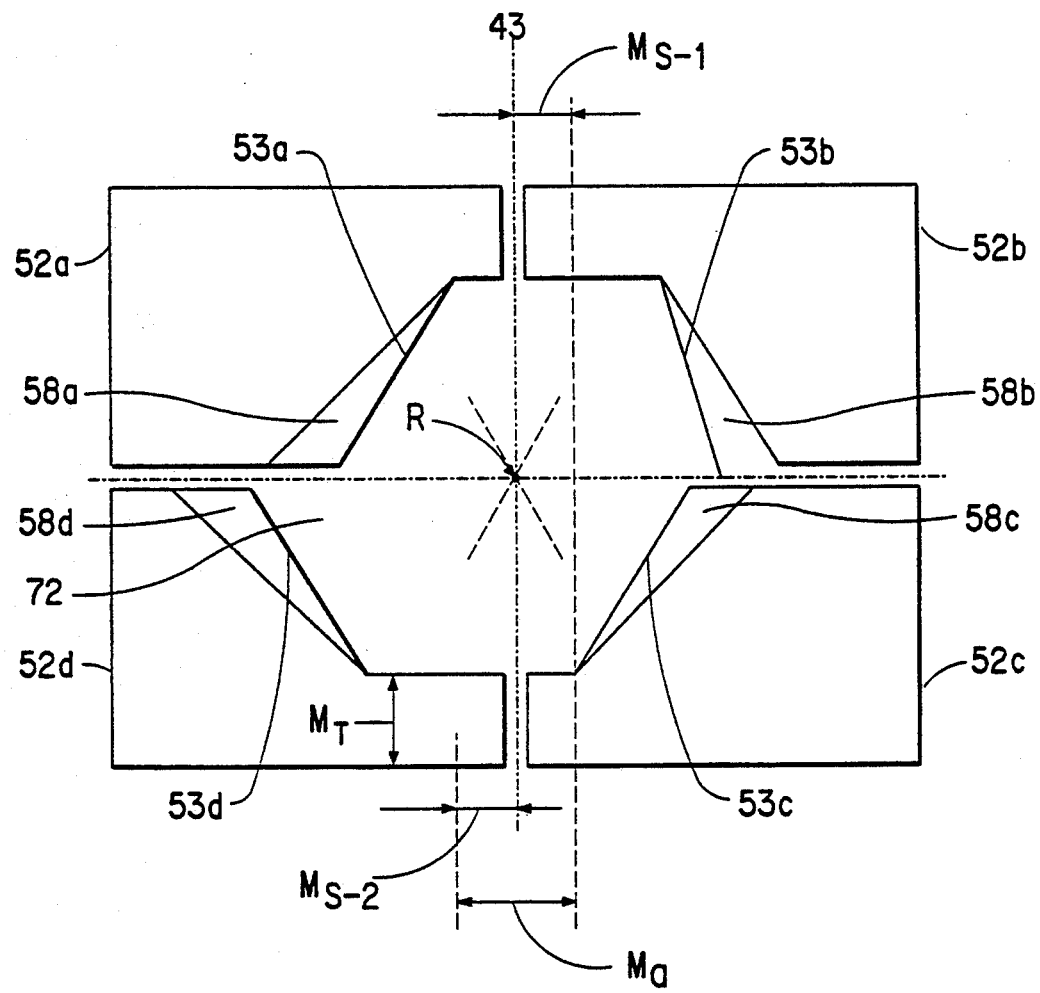
FIG. 13 is a front elevational view of the assembled centering device, similar to FIG. 4, illustrating the situation when the finger pairs are misaligned.

In the assembled condition, which is best shown in FIG. 6 and FIGS. 9-12, corresponding fingers in each pair are disposed in superimposed relationship one above the other, with groove $56_U$, $56_L$ and troughs $60_U$ and $60_L$ cooperatively defined by the fingers in one pair registering with the corresponding groove and trough formed by the cooperative action of the fingers in the other pair. Grooves $56_U$, $56_L$, formed by the cooperative action of the fingers in each pair, are themselves registered and thus cooperate to define a channel 72 as shown in FIGS. 6 and 12. Channel 72 has an input end 74 and an output end 76 as shown in FIG. 9. Reference axis R extends centrally and axially through channel 72, as also shown in FIG. 9. Preferably, reference axis R lies in a first reference plane $RP_1$ as shown in FIG. 12 parallel to surfaces 54a-d on each finger 42a-d, respectively. Most preferably, reference axis R also lies in a second reference plane $RP_2$ as shown in FIG. 12 containing cut line 43 defining each pair of fingers in the finger set. It should be understood that manufacturing tolerances can result in slight misalignment of axis R with respect to reference plane $RP_2$. The consequences of such a misalignment will be discussed more fully hereafter.

Registered troughs $60_U$ and $60_L$ (and the lead-in corners of each enlargement abutment 55a-d, if present) cooperate to define a guideway 78 as shown in FIG. 9. Axis R extends through guideway 78 and lies in the plane containing upper surfaces 61a-d of abutments 55a-d respectively, as shown in FIG. 11. A reference plane $RP_1$ contains upper surfaces 61a-d. A reference plane $RP_2$ as shown in FIG. 11 contains the axes of the troughs. The intersection of reference plane $RP_1$ and reference plane $RP_2$ is a line, which is axis R.

Planar surfaces 54a-d on opposed corresponding fingers in each pair are, when in a first, or closed position, either in contact with each other or may, as preferred, be within a predetermined close distance to each other to insure they will not be affected in joining operations, to join 42a to 42d at upper surfaces 61a and 61d, respectively, and to join 42b to 42c at upper surfaces 61b and 61c, respectively. For optical fibers, the predetermined close distance is typically on the order of one (1) to two (2) μm. Planar surfaces 54a-d are not secured to each other and thus may move to a second, or centering, position as will be described.

When assembled, as shown in FIG. 6, clips 50 disposed at the ends of fingers 42a-d are supported in a cantilevered fashion from conjoined enlargement abutments 55a-d at the opposite ends of the fingers, respectively. Each finger 42a-d is relatively rigid in the x-z plane, as defined by the coordinate axes shown in FIG. 6. Moreover, the relatively thin dimension of the central region of the base portion of each finger 42a-d axially intermediate respective enlargement abutment 55a-d acts as a flexure and permits the clips at the end of each finger 42a-d to flex, springboard fashion, in the directions of arrows 88 as shown in FIGS. 4-6 in the y-z plane. As the term is used herein a flexure is a spring member that is relatively rigid in one plane and is constrained to flex in the orthogonal plane.

It should further be appreciated that when each clip on each respective finger is deflected in its corresponding respective direction as shown by arrows 88, the resiliency of the thinner central region of the base of each finger, acting as a flexure, defines a mechanism for biasing fingers 42a-d and the clips thereon toward the closed position. The biasing force acts on each clip in a direction shown by arrows 90 in FIGS. 4-6, counter to the biasing direction as shown by arrows 88. It should be understood that any other convenient mechanism may be used to provide the means for biasing the clips toward the closed position. The biasing forces must be substantially equal and in opposite directions. A biasing mechanism employing a thinner central region of the base as a flexure is, however, again preferred because when implemented in a single crystal material using a microfabrication technique, precise control of the biasing forces is able to be attained. Typically, the biasing force on each finger is on the order of twenty (20) grams.

Having defined the structure of a centering device, such as centering device 40a, the operation thereof in positioning center point P on the center axis and on end face E of optical fiber F along predetermined reference axis R may be readily understood in connection with FIGS. 2-5 and 9-12. As is clearly visible in FIGS. 2 and 5, when positioning center point P into alignment with reference axis R, centering device 40a actually contacts the fiber at contact points lying a close distance from end face E. Assuming that reference R as shown in FIG. 12 of channel 72 aligns with both first and second reference planes $RP_1$ and $RP_2$ as shown in FIG. 11, fiber F is inserted into centering device 40a in the direction of arrow 102 as shown in FIGS. 5, 9 and 10. Fiber F is inserted into guideway 78 defined by registered troughs $60_U$ and $60_L$. Fiber F then enters channel 72 and is initially displaced, or moved, through contact with at least one of sidewalls 53a-d or portions of the first major surface of each finger used to define grooves $56_U$, $56_L$ on one of the clips to the extent necessary to accurately place center point P on an end face E of fiber F toward alignment with reference axis R.

Since the outer diameter of cladding layer L, shown in FIG. 4, of fiber F exceeds the dimension of channel 72 formed by the sidewalls, fingers 42a-d respond to a deflecting force in the direction of arrow 88 imposed thereon by fiber F by displacing from the first, or closed, position, shown in FIGS. 6 and 12, toward a second, or centering position, as shown in FIGS. 4 and 5, after fingers 42a-d are deflected. In the centering position, the clips of each finger open against the biasing force acting in the direction of arrows 90 generated by the flexing of fingers 42a-d to separate surfaces 54a-d thereon. This movement of fingers 42a-d from the open toward the closed position accurately positions center point P on end face E of fiber F in alignment with reference axis R. End face E of fiber F thus exits through outlet end 76 of channel 72 with center point P accurately positioned in alignment with reference axis R, as is shown in FIG. 4. Fiber F is held in this position by contact with sidewalls 53a-d.

In some instances, owing either to misalignment between arms (before they are slit to form finger pairs), misalignment between cut lines 43 in each finger pair and the desired location of the cut lines in each arm, mismatches of finger thickness, and/or mismatches of finger widths, the assembled position of the superimposed finger pairs will appear as shown in FIG. 13. Diametrically opposite sidewalls 53a-d on diametrically opposite abutments 52a-d are not equally spaced from reference axis R. The misalignment of the arms (prior to slitting to form finger pairs) is indicated by reference character $M_a$. The misalignment of resulting cut lines 43 is indicated by reference characters $M_{S\text{-}1}$ and $M_{S\text{-}2}$. The thickness of each finger is indicated by reference characters $M_T$.

Figure 14:
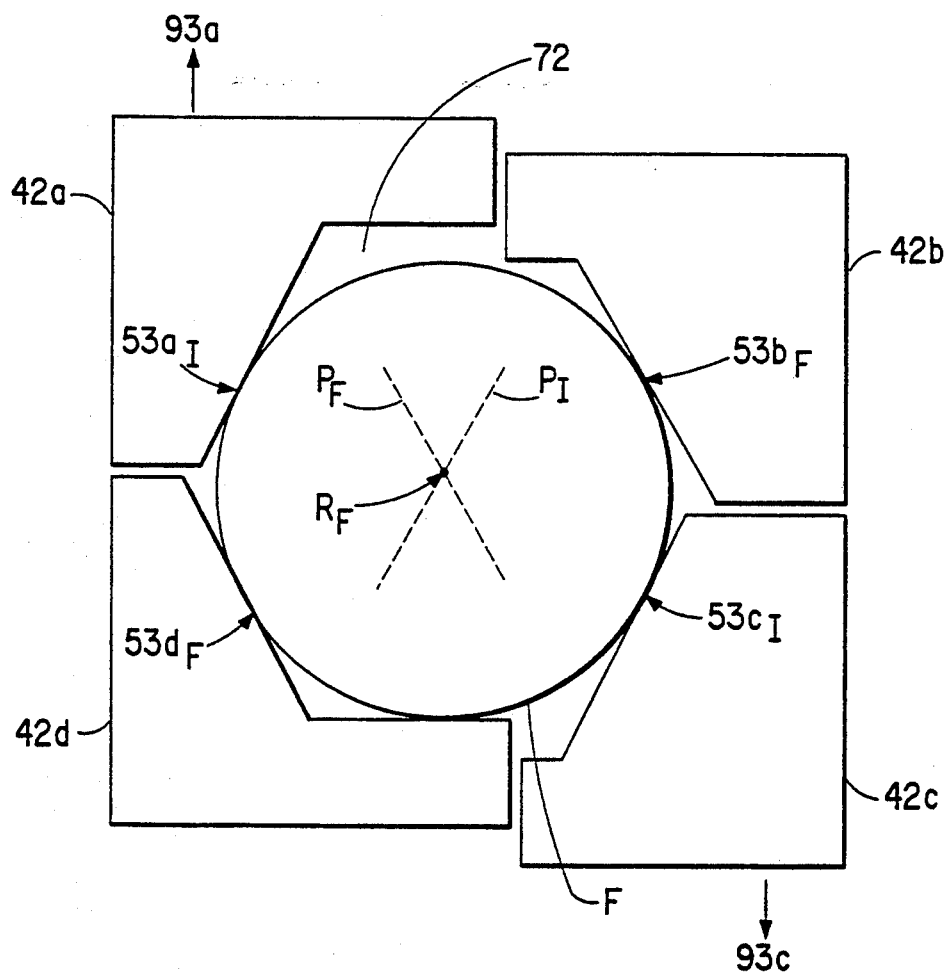
FIG. 14 is a front elevational view of the assembled centering device, illustrating the misaligned finger pairs holding a finger in the centering position.

As seen in FIG. 13, when fiber F is inserted into channel 72 formed from arms or fingers with such misalignments(s), fiber F will first strike a first contact point $53a_I$ on lead-in surface 58a and then a second contact point $53c_I$ on lead-in surface 58c as shown in FIGS. 13 and 14. Contact points $53a_I$ and $53c_I$ form the narrowest restriction for the fiber. As the fiber continues to move down channel 72, sidewalls 53a and 53c are forced apart in the direction of arrows 93a, 93c. However, since the bias forces generated by the movement of the first contacted sidewalls are opposite, fiber F becomes centered in an interim centered position in a plane parallel to and centrally located between two such surfaces. This interim centered position lies at some point in the plane indicated in FIG. 14 by a line denoted at reference character $P_I$.

Continued advancement of fiber F through channel 72 causes the outer diameter of fiber F to touch one, then both of the remaining pair of sidewalls. The first touch of the fiber to sidewalls 53a or 53c is not the final position of the fiber. The final position of the fiber is achieved when the two fingers on both diametrically opposite sidewall pairs as shown in FIG. 14 have moved sufficiently to center the fiber. These final contact points are illustrated in FIG. 14 at reference characters $53b_F$ and $53d_F$. Since the biasing forces created by movement of these last two sidewalls are also equal and oppositely directed, the fiber is finally centered on the intersection of plane $P_I$ and another plane $P_F$. Plane $P_F$ is parallel to and centrally located between the two surfaces touched at contact points $53b_F$ and $53d_F$.

The final position of fiber $F_1$, having final reference axis $R_F$, may be displaced from the desired reference axis due to the misalignments defined earlier and to other variations within manufacturing tolerances. To make a splicing device for typical single mode optical fibers, the splicing device must be able to handle fibers ranging in diameter from 125 to 128 $\mu$m. This range is found to be the typical diameter variation in quality single mode fibers.

To insure that a fiber is held properly by all four fingers, the alignment of wafers for bonding during the fabrication process must limit variation of the misalignment in the direction across $M_a$ of FIG. 13 to $\pm 9.5$ $\mu$m. This direction of misalignment reduces the range of fiber diameter variation that is handled. The misalignment of wafers in the other direction, along the length of the reference axis, should be no more than twenty (20) $\mu$m. This direction of misalignment results in the clamping points of one pair of side-by-side fingers being axially displaced from those points of the other pair of side-by-side fingers, which would tend to bend the fiber slightly upwardly or downwardly. The thickness of the flexure portion of the fingers should not vary by more than $\pm$ three (3) $\mu$m, so spring forces will be balanced with the fiber centered.

Commonly held tolerances in the microfabrication arts, such as in the microfabrication of devices as pressure rupture discs, are well within the above ranges. In fact, when using the splicing device as described herein, assuming the use of an enhanced splicing device having an alignment clamp, as shown in FIG. 13, estimates show, in practice, the above maximum variations would result in:

$\pm 5$ $\mu$m for side wise misalignment, $M_a$,
$\pm 1.5$ $\mu$m for flexure thickness $M_T$,
$\pm 10$ $\mu$m for axial misalignments of wafers.

Other variations, such as flexure width and friction encountered when a fiber is centered by actions of the four fingers, are small. The net result using commonly achievable manufacturing tolerances for microfabricated parts is well under one (1) micrometer in displacement of the center point on the end face of the fiber from alignment with the reference axis. Even for the maximum variations discussed above, the displacement of the center of the fiber end face from alignment with the desired reference axis is well under one (1) micrometer.

The connector assembly of the present invention also comprises a housing 38 as shown in FIG. 1. Housing 38 is preferably a two-piece housing comprising an upper portion $38_U$ and a lower portion $38_L$. This allows for ease of assembly, since the splicing device and portions of the first and second optical fiber may be properly positioned therein, and the upper and lower halves may then be snapped or glued together. Housing 38 encloses splicing device 140, second portion 36 of second optical fiber 26 and first predetermined length 18 of first bare optical fiber 20. In addition, housing 38 provides strain relief for first predetermined length 18 of first bare optical fiber 20 and for second portion 36 of second optical fiber 26. The housing also fastens and positions the end of the optical fiber cable. The shape of the housing can vary according to the finished product.

Each housing portion can be made from plastic using standard injection molding techniques as practiced in the trade. Molded into each housing portion are features to enable the proper assembly of connector assembly 10. Each portion $38_U$ or $38_L$ of the housing has a first end 150a or 150b, respectively, which has a slot 152a or 152b, respectively, to receive the larger diameter, first end 28 of ferrule 22 as shown in FIG. 1. Each portion $38_U$ or $38_L$ of the housing has a rectangular chamber 154a or 154b, respectively, molded to be the same length as splicing device 140, disposed in the center of each housing portion on a central axis thereof. Each portion $38_U$ or $38_L$ of the housing also has a second end 156a or 156b, respectively, with a hole 158a or 158b, respectively, to receive optical fiber cable 12. Each portion $38_U$ or $38_L$ of the housing has a first groove 160a or 160b, respectively, of a predetermined length on the central axis of each respective portion to receive second portion 36 of second optical fiber 26. Each portion $38_U$ or $38_L$ of the housing also has a second groove 164a or 164b, respectively, of a second predetermined length between hole 158a and chamber 154a, or between hole 158b and chamber 154b on the central axis of the respective housing portions to receive first bare optical fiber 20.

Assembly of connector assembly 10 can be accomplished as follows. First, fiber portion 36 is placed into splicing device 140. Ferrule first end 28 is then dropped into slot 152b at the same time splicing device 140 is dropped into chamber 154b. Index matching fluid is placed in the center of the splicing device onto cleaved end 37. The sub-assembly of ferrule 22, second optical fiber 26 and splicing device 140 are in lower portion $38_L$ of housing, so that they all rest in slot 152b, first groove 160b and chamber 154b, respectively. The first predetermined length of first groove 160b is measured before-hand, so that when ferrule 22, with the splicing device on the end on second portion 36 of the second optical fiber 26, is placed into lower portion $38_L$ of the housing, cleaved end 37 will remain located at the center of splicing device 140. Upper portion $38_U$ of the housing is placed onto lower portion $38_L$, securing the two portions together so that they enclose and secure the large end of ferrule 22, second portion 36 of second optical fiber 26 and splicing device 140 and so that cleaved end 37 will remain located at the center of the splicing device.

The connector assembly is now ready for "field" installation of optical fiber cable 12 into the connector assembly. This is accomplished by cutting the end of optical cable 12 and stripping back a length of protective covering to expose a length of first bare optical fiber 20. Bare optical fiber 20 can be scored and cleaved to its predetermined length by measuring from the end of cable 12 along bare optical fiber 20 to determine the score and cleave point. Cleaved end 21 of first bare optical fiber 20, with predetermined length 18, can be inserted into housing hole 158a, 158b, thus inserting bare optical fiber 20 into the splicing device now contained within housing 38 and sliding it into the splicing device until cleaved end 21 just contacts cleaved end 37 of second portion 36 of second optical fiber 26 and the index matching fluid. The second predetermined length of groove 164 is determined to be just the length necessary so that first predetermined length 18 bare optical fiber 20 extending from the end of optical fiber cable 12 will reach to the center of splicing device 140 and touch cleaved end 37 of second portion 36 of second optical fiber 26 when optical fiber cable 12 is inserted fully into hole 158a, 158b in housing 38. The optical fiber cable is secured into housing 38, by glue or other means, to provide strain relief and to secure the position of cleaved end 21 of first bare optical fiber 20 to just touch cleaved end 37 of second portion 36 of second optical fiber 26 already secured in place in splicing device 140. Any other means could also be used to secure optical cable 12 to housing 38, depending on the intended application of connector assembly 10.

Additional advantages and modifications will readily occur to those skilled in the art. The invention in its broader aspects is therefore, not limited to the specific details and representative apparatus shown and described. Accordingly, departures may be made from such details without departing from the spirit or scope of the general inventive concept as defined by the appended claims and their equivalents.

We claim:

1. A connector assembly for connecting an optical fiber cable to a socket, the optical fiber cable including a first end and a first predetermined length of a first bare optical fiber extending from the first end, comprising:
   (a) a ferrule for holding a second optical fiber, the ferrule having a first end, a second end, a central axis extending between the first and the second end and a hole extending along the central axis, a first portion of the second optical fiber being disposed in the hole and a second portion of the second optical fiber extending from the first end of the ferrule, wherein the ferrule and the end of the second optical fiber disposed at the second end of the ferrule are polished and the ferrule is made of molded plastic comprising a liquid crystal polymer;
   (b) a device for splicing the second portion of the second optical fiber to the first predetermined length of the first bare optical fiber; and
   (c) a housing for enclosing the splicing device, the second portion of the second optical fiber and the first predetermined length of the first bare optical fiber, the housing providing strain relief for the first predetermined length of the first bare optical fiber and for the second portion of the second optical fiber.

2. The connector assembly as claimed in claim 1, wherein the ferrule is made of a plurality of materials.

3. The connector assembly as claimed in claim 2, wherein the materials comprise the liquid crystal polymer and glass.

4. The connector assembly as claimed in claim 1, wherein the ferrule and the end of the second optical fiber disposed at the second end of the ferrule are polished.

5. The connector assembly as claimed in claim 1, wherein the first bare optical fiber is cleaved at an end thereof to the first predetermined length.

6. The connector assembly as claimed in claim 5, wherein the second portion of the second optical fiber is cleaved at an end thereof to a second predetermined length.

7. The connector assembly as claimed in claim 1, wherein the housing comprises an upper portion and a lower portion.

8. The connector assembly as claimed in claim 1 wherein the housing comprises an upper portion and a lower portion.

9. The connector assembly as claimed in claim 8, wherein the splicing device comprises a plurality of centering devices, disposed facing each other with a gap therebetween, and a clamp disposed in axial alignment with each of the centering devices.

10. The connector assembly as claimed in claim 9, wherein each clamp comprises a centering device.

* * * * *